United States Patent [19]
Deleeuw et al.

[11] Patent Number: 5,268,336
[45] Date of Patent: Dec. 7, 1993

[54] PREPARATION OF SUBSTANTIALLY POLYCRYSTALLINE SILICON CARBIDE FIBERS FROM METHYLPOLYDISILYLAZANES

[75] Inventors: David C. Deleeuw; Jonathan Lipowitz; James A. Rabe, all of Midland, Mich.

[73] Assignee: Dow Corning Corporation, Midland, Mich.

[21] Appl. No.: 539,265

[22] Filed: Jun. 18, 1990

[51] Int. Cl.$^5$ .............................................. C04B 35/52
[52] U.S. Cl. ...................................... 501/88; 501/95; 501/92; 264/65
[58] Field of Search ...................... 501/95, 88, 90, 92; 264/65

[56] References Cited

U.S. PATENT DOCUMENTS

| | | | |
|---|---|---|---|
| 4,100,233 | 7/1978 | Yajima et al. | 423/345 |
| 4,152,509 | 5/1979 | Yajima et al. | 528/4 |
| 4,220,600 | 9/1980 | Yajima et al. | 556/434 |
| 4,248,814 | 2/1981 | Yajima et al. | 264/63 |
| 4,283,376 | 8/1981 | Yajima et al. | 423/345 |
| 4,298,559 | 11/1981 | Baney et al. | 264/65 |
| 4,310,651 | 1/1982 | Baney et al. | 528/21 |
| 4,342,712 | 8/1982 | Yajima et al. | 264/63 |
| 4,347,347 | 8/1982 | Yajima et al. | 528/30 |
| 4,359,559 | 11/1982 | Yajima et al. | 525/475 |
| 4,482,689 | 11/1984 | Haluska | 528/25 |
| 4,604,367 | 8/1986 | Takamizawa et al. | 501/95 |
| 4,657,991 | 4/1987 | Takamizawa et al. | 525/477 |
| 4,746,480 | 5/1988 | Clark | 264/62 |
| 4,757,035 | 7/1988 | Baney et al. | 501/88 |
| 4,772,516 | 9/1985 | Mahone | 428/447 |
| 4,810,443 | 3/1989 | Barnard | 264/85 |
| 4,863,799 | 9/1989 | Mininni et al. | 428/373 |
| 4,921,657 | 5/1990 | Rabe et al. | 264/86 |

OTHER PUBLICATIONS

"Composition and Structure of Ceramic Fibers Prepared from Polymer Precursors" Lipowitz et al. *Advanced Ceram. Mat'ls* 2[2] 121–128 1987.

*Primary Examiner*—Peter A. Nelson
*Attorney, Agent, or Firm*—James E. Bittell

[57] ABSTRACT

A process for the preparation of substantially polycrystalline silicon carbide fibers is provided. The fibers may be fabricated to have a small diameter and are thermally stable at high temperatures. The process is carried out by initially forming fibers from a preceramic polymeric precursor comprising methylpolydisilylazane resins. The fibers are then infusibilized to render them non-melting followed by a pyrolysis step in which the fibers are heated to a temperature in excess of 1600° C. in a nonoxidizing atmosphere to form substantially polycrystalline silicon carbide fibers. The substantially polycrystalline silicon carbide fibers which are formed by the process of the present invention have at least 75% crystallinity and have a density of at least about 2.9 gm/cc.

The polymeric precursor or the fibers contain, or have incorporated therein, at least about 0.2% by weight boron. This incorporation of boron may be accomplished either prior to or during formation of the fibers or during at least one of the infusibilizing or pyrolyzing steps of the process.

20 Claims, 2 Drawing Sheets

PREPARATION OF SUBSTANTIALLY POLYCRYSTALLINE SILICON CARBIDE FIBERS FROM METHYLPOLYDISILYLAZANES

The U.S. Government has rights in this invention pursuant to Contract No. F33615-83-C-5006 awarded by the U.S. Air Force.

BACKGROUND OF THE INVENTION

This invention relates to the preparation of substantially polycrystalline ceramic fibers from preceramic polymeric precursors, and more particularly to the incorporation of boron into fibers formed from methylpolydisilylazane (MPDZ) resins to produce high temperature stable silicon carbide fibers.

In recent years ceramic materials have been developed for uses requiring good mechanical strength at high temperatures. Silicon carbide is one such ceramic material which possesses desirable high temperature properties. For example, fibers of silicon carbide have been used as a reinforcing material in composite materials such as fiber reinforced metals and fiber reinforced ceramics. However, the hardness and high temperature properties of silicon carbide make it difficult to fabricate and work with so that various methods of fabrication have been developed depending on the desired form of the final article to be produced.

Many different processes have been used in attempts to manufacture silicon carbide fibers. Some have used inorganic silicon carbide powders as the starting material. However, those processes are useful only for the production of relatively large diameter fibers (approximately 70 micrometers and larger). Smaller diameter fibers are more desirable because they are more flexible, can be woven, and provide better reinforcement of metal and ceramic matrix materials.

Where it is desired to produce small diameter fibers of silicon carbide, one method which has been used is to spin an organosilicon polymer into a fiber. The fiber is then infusibilized to render it nonmelting (typically by air treatment at somewhat elevated temperatures) followed by pyrolysis at high temperatures to produce a ceramic fiber.

A problem in the preparation of silicon carbide fibers by the above method is that substantial amounts of oxygen and or nitrogen may either already be present in or introduced into the fibers during spinning, infusibilization, or ceramification. The presence of this oxygen and/or nitrogen adversely affects the thermal stability of the fibers. That is, as the fibers are ceramified at high temperatures, the oxygen and/or nitrogen present in the fibers leaves the fibers, causing weight losses, porosity, and losses in tensile strength in the fibers. While lower ceramification temperatures may be used to decrease the amount of oxygen and/or nitrogen lost, exposure of such fibers to high temperatures during use results in the same problem of the oxygen and/or nitrogen present in the fibers leaving the fibers, causing weight losses, porosity, and losses in tensile strength in the fibers.

Workers have attempted to minimize the oxygen and/or nitrogen present in ceramics fabricated from organosilicon polymers by using the classes of polymers known as polycarbosilanes (PCS) or methylpolysilanes (MPS). The polymeric backbone structure of polycarbosilanes consists of only silicon and carbon and the backbone structure of methylpolysilanes consists of only silicon as opposed to polyorganosiloxanes in which the polymeric backbone structure consists of silicon and oxygen and methylpolydisilylazanes (MPDZ) in which the polymeric backbone structure consists of silicon and nitrogen. For example, Yajima et al, U.S. Pat. No. 4,100,233, teaches a process for the production of silicon carbide fibers using polycarbosilanes as a starting material. Baney et al, U.S. Pat. Nos. 4,310,651 and 4,298,559 teach processes for the production of silicon carbide fibers using methylpolysilanes as a starting material.

Nicalon (trademark), a commercially available silicon carbide containing ceramic fiber based on a polycarbosilane starting material, is produced by the above-described process of fiber spinning, infusibilization, and then pyrolysis. However, the Nicalon fibers so produced contain significant amounts of oxygen (9–15% by weight). It is known that Nicalon's mechanical properties degrade at elevated temperatures as low as 1200° C. due to weight losses and porosity as the oxygen leaves the fibers.

Some workers have incorporated other elements into silicon carbide-based bodies derived from polycarbosilanes in an attempt to improve the mechanical properties of the bodies. Thus, elements such as boron, titanium, and zirconium have been introduced into preceramic polymers. Yajima et al, U.S. Pat. No. 4,248,814, teaches sintering a polycarbosilane and up to 15% by weight of a borosiloxane polymer to produce a ceramic.

Yajima et al, U.S. Pat. No. 4,359,559, teaches the production of a polymetallocarbosilane by mixing a polycarbosilane with a titanium or zirconium containing organometallic compound. Yajima et al, U.S. Pat. No. 4,347,347, teaches the production of a block copolymer of a polycarbosilane and a polymetallosiloxane. Yajima et al, U.S. Pat. No. 4,342,712, teaches the production of titanium, silicon, and carbon-containing ceramic fibers from a block copolymer of a polycarbosilane and a titanoxane. Yajima et al, U.S. Pat. No. 4,152,509, teaches the incorporation of boron into the backbone of a polysiloxane to form a borosiloxane polymer which is then mixed with a powdered silicon carbide and cold pressed into a molded article.

Yajima et al, U.S. Pat. Nos. 4,220,600 and 4,283,376, teach the preparation of Si-C-O containing fibers by spinning, curing, and pyrolysis of polycarbosilanes containing up to 15% by weight of a borosiloxane polymer. This is taught to provide not more than 500 ppm boron in the ceramic fiber. While pyrolysis temperatures of up to 1800° C. are disclosed, none of the examples utilize pyrolysis temperatures above 1300° C., and the preferred pyrolysis temperature range is taught to be from 1000° to 1500° C.

Haluska, U.S. Pat. No. 4,482,689, teaches the preparation of silicon carbide based ceramic fibers using polymetallo(disily)silazane starting materials containing either boron, titanium, or phosphorous as the metals. However, the fibers which were formed were pyrolyzed only at temperatures of about 1200° C.

However, the prior art describes problems with the incorporation of these elements (sometimes termed heteroatoms) into the polymer. For example, the synthesis procedures for heteroatom incorporation involve high temperature and pressure reaction conditions. The yields of the resulting polymers are low. Also, the heteroatoms bond to the silicon atoms in the polymer backbone through intermediate oxygen linkages so that increasing amounts of oxygen are present in the polymer. Further, silicon carbide-based fibers so produced are typically composed of extremely fine crystalline grains; heating the fibers to temperatures of 1300° C. or higher causes growth of the grains which results in a decrease in mechanical strength of the fibers. See, Takamizawa et al, U.S. Pat. No. 4,604,367 at column 1.

Takamizawa et al, U.S. Pat. No. 4,604,367, teaches the preparation of an organoborosilicon polymer by mixing an organopolysilane with an organoborazine compound, spinning fibers, and then ceramifying the fibers by heating at temperatures in the range of from "900°" to 1800° C". However, the actual examples in Takamizawa show heating up to only 1500° C., and the tensile strength of the Takamizawa fibers is shown to drop off dramatically when heated to temperatures approaching 1500° C.

Takamizawa et al, U.S. Pat. No. 4,657,991, teaches the formation of ceramic precursors of silicon carbides using a polycarbosilane and an organometallic compound containing boron, aluminum, titanium, or zirconium. The patentee teaches pyrolysis of the polymer at temperatures between about 800° and 1500° C. Pyrolysis temperatures above 1500° C. are taught to decrease the mechanical strength of the resulting fibers due to grain size growth.

However, there are a number of applications for ceramic fiber materials which must be able to withstand exposure to much higher temperatures above 1500° C. while retaining their mechanical strength properties. Thus, there remains a need in the art for thermally stable, small diameter silicon carbide fibers for use in both metal and ceramic matrix composites which can withstand very high temperatures of operation.

SUMMARY OF THE INVENTION

The present invention meets that need by providing a process for the preparation of substantially polycrystalline silicon carbide fibers, and the product produced thereby, which can be fabricated to have a small diameter and which are thermally stable at high temperatures. The process is carried out by initially forming fibers from a preceramic polymeric precursor comprising methylpolydisilylazane resins. The fibers are then infusibilized to render them nonmelting, followed by a pyrolysis step in which the fibers are heated to a temperature in excess of 1600° C. in a nonoxidizing atmosphere to form substantially polycrystalline silicon carbide fibers. The substantially polycrystalline silicon carbide fibers which are formed by the process of the present invention have at least 75% crystallinity, a density of at least about 2.9 gm/cm$^3$, and a very low residual oxygen and/or nitrogen content.

The polymeric precursor or the fibers contain, or have incorporated therein, at least about 0.2% by weight boron. This incorporation of boron may be accomplished either prior to or during formation of the fibers, or during at least one of the infusibilizing or pyrolysis steps of the process. For example, boron may be incorporated directly into the polymeric precursor by reacting the precursor with a boron-containing compound or by mixing the boron-containing compound with the precursor. Alternatively, boron may be incorporated into the polymeric precursor during the infusibilization step by exposing the polymeric precursor to a boron-containing gas. In yet another alternative embodiment, boron may be incorporated into the precursor fibers during the pyrolysis step by exposing the precursor fibers to a boron-containing gas. It is preferred that the boron present be substantially uniformly distributed throughout the fibers.

The polymeric fibers may be formed by any of a number of conventional fiber forming processes. For example, the fibers may be formed by spinning techniques such as melt spinning, wet spinning, or dry spinning. A preferred fiber-forming class of polymers is methylpolydisilylazanes having phenyl and vinyl substituents. It has been found that this class of polymers are solids at room temperatures and have softening points which render them readily formable into fibers using melt spinning techniques. Such polymers may be readily drawn into fibers having diameters of 100 micrometers or less, and preferably having diameters from about 50 micrometers down to about 10 micrometers.

The fibers are then infusibilized to render them nonmelting by curing and crosslinking them in a conventional manner. For example, the fibers may be cured in air. Alternatively, the fibers may be infusibilized by curing the fibers with gamma irradiation or ultraviolet light.

The fibers may also be infusibilized, and at the same time have boron incorporated therein, by curing the fibers in an atmosphere containing a mixture of boron trichloride and ammonia or boron trichloride and an amine. The fibers may also be infusibilized by curing the fibers in an atmosphere containing diborane, or first in an atmosphere containing nitric oxide followed by an atmosphere containing boron trichloride or diborane.

After infusibilization, the fibers are then pyrolyzed by heating them to a temperature in excess of about 1600° C., and preferably at a temperature of about 1800°-1850° C. Temperatures in excess of about 2000° C. are not preferred as there is undesirable grain size growth of the silicon carbide which adversely affects fiber strength. The nonoxidizing atmosphere comprises a gas such as, for example, argon, helium, and mixtures thereof, or may be a vacuum. The time for which the fibers are held at a particular maximum temperature will vary inversely with the temperature. The duration of the pyrolysis treatment should be sufficient to eliminate substantially all oxygen and/or nitrogen from the fibers. For example, where the fibers are heated to about 1800° C., it has been found that that temperature should be maintained for about one hour. Lower pyrolysis temperatures require correspondingly longer treatment times.

Surprisingly, the methylpolydisilylazanes used in the practice of the present invention form temperature stable silicon carbide fibers despite the substantial amount of nitrogen present in the initial polymer, and despite the fact that nitrogen forms a part of the polymer backbone structure. Through the controlled addition of boron to the polymer, or to the fibers at some point in the process, dense, polycrystalline silicon carbide fibers are formed which exhibit improved mechanical strengths at high operating temperatures above about 900° C. If boron is not present in the fiber during the high temperature stage (i.e., about 1300° to 1600° C.) of the pyrolysis, the fibers lose their shape and have very low strength.

Accordingly, it is an object of the present invention to provide a process for the preparation of substantially polycrystalline silicon carbide fibers, and the product produced thereby, which can be fabricated to have a small diameter and which are thermally stable at high temperatures. This, and other objects and advantages of the present invention, will become apparent from the following detailed description, the accompanying drawings, and the appended claims.

DETAILED DESCRIPTION OF THE PREFERRED EMBODIMENTS

Figure 1A:
FIGS. 1a and 1b are photomicrographs (magnification 5,000×) taken with a scanning electron microscope of methylpolydisilylazane fibers after treatment at 1800° C. for 1 hour in argon atmosphere; the fiber of FIG. 1a had no boron, while the fiber of FIG. 1b, produced by the process of the present invention, contained about 0.5% boron by weight in the polymer.

The polymeric precursor compositions which are used in the practice of the present invention are selected from the class of methylpolydisilylazane resins. Such polymers are typically solids at room temperature, can be readily spun into small diameter fibers, can be rendered infusible such that the polymer will remain in fiber form during pyrolysis, and when pyrolyzed produce a ceramic composition in which the carbon to silicon ratio is roughly 1.5 to 1.

Preferably, the resins are solids at room temperature. They may have softening points which render them readily extrudable for conventional fiber spinning techniques such as melt spinning, or they may be more suitable for spinning using wet or dry spinning techniques.

The methylpolydisilylazanes may be formed into fibers by any of a number of conventional spinning techniques such as melt spinning, dry spinning, or wet spinning. After spinning, the fibers are drawn to very small diameters of less than about 100 micrometers, and preferably from about 50 micrometers down to about 10 micrometers. These small diameters provide ceramic fibers which are more readily woven into reinforcing matrices for composite materials.

The methylpolydisilylazanes useful in the practice of the present invention include those taught by Gaul, Jr., U.S. Pat. No. 4,340,619 and Haluska, U.S. Pat. No. 4,482,689. A preferred class of methylpolydisilylazanes are those having phenyl and vinyl substituents.

The polymeric precursor or the fibers contain, or have incorporated therein, at least about 0.2% by weight boron, and most preferably at least about 0.6% by weight boron. Also, it is desirable that the boron present in the fibers be substantially uniformly distributed throughout the fibers. This incorporation of boron may be accomplished either prior to or during formation of the fibers or during at least one of the infusibilizing step or the initial heating period of the pyrolysis. For example, boron may be incorporated directly into the polymeric precursor by reacting the precursor with a boron-containing compound or by mixing a boron-containing compound with the precursor. For example, Haluska, U.S. Pat. No. 4,482,689, the disclosure of which is hereby incorporated by reference, teaches the preparation of polymetallo(disily)silazane polymers containing boron by reacting chlorine-containing disilanes and certain reactive metal halides such as boron tribromide. Other known reaction procedures may also be used to incorporate boron into the polymeric precursor.

Alternatively, boron may be incorporated into the polymeric precursor during the infusibilization step by exposing the polymeric precursor to a boron-containing gas. This may be accomplished at relatively low temperatures of between about 50° to about 200° C. and below the softening point of the polymeric precursor. For example, the polymeric precursor may be exposed to a diborane-containing gas which diffuses into the surface of the polymeric precursor fibers and through to their cores and deposits boron therein. A diborane concentration of from about 0.01 to about 1.0% by volume in an otherwise inert gas such as argon has been found to provide an atmosphere which will cure (infusibilize) the polymeric precursor while incorporating the desired concentration of boron into the fibers. Cure times should be sufficient to permit the boron to diffuse substantially uniformly throughout the fibers to provide concentration levels of at least 0.2% by weight.

While the use of higher temperatures provide faster curing of the polymer, it is desired to maintain the integrity of the fibers during cure. Accordingly, the softening point of the polymer should not be exceeded during infusibilization. However, it has been found that as the cure proceeds, the softening temperature of the polymeric precursor increases so that the curing temperature may be raised as the polymer cures. Alternatively, the polymeric precursor fibers may be infusibilized by sequential exposure to a boron containing gas such as boron trifluoride, boron tribromide, or boron trichloride and then to an amine such as ammonia at temperatures in the range of from about 25° to about 200° C. Preferably, both the boron containing gas and amine gases are diluted with an otherwise inert gas such as argon or nitrogen. It is preferred that the boron containing gas concentration in the curing atmosphere be in the range of from about 10 to about 30% by volume, while the amine is present in the range of from about 1 to about 15% by volume.

Again, it is preferred to heat the fibers slowly so that their softening temperature is not exceeded. However, as the cure proceeds, the softening temperature of the polymer will rise, and the curing temperature can also be increased accordingly as the cure proceeds. The cure times should be sufficient to permit the boron to diffuse into the fibers and be substantially uniformly distributed therein to the desired concentration levels. Cure times in the range of from 4 to about 24 hours have been found to be adequate. Of course, optimum curing times depend on not only the polymer treated, but also the diameter of the fibers and the concentration of boron in the curing atmosphere.

In yet another alternative embodiment of the invention, the polymeric precursor fibers may be cured by exposure first to an atmosphere containing nitric oxide followed by exposure to an atmosphere containing boron trichloride or diborane. Nitric oxide concentrations in the range of from about 1 to about 10% by volume in an otherwise inert gas such as argon have been found to be useful when followed sequentially by exposure of the fibers to an atmosphere containing either boron trichloride or diborane. A general description of the nitric oxide cure process is contained in U.S. Pat. No. 4,847,027, the disclosure of which is incorporated by reference.

Again, exposure of the fibers to the boron-containing atmosphere is carried out at temperatures below the softening temperatures of the fibers. It has been found that temperatures in the range of from about 25° to about 200° C. may be used. Increasing the temperature over time as the cure proceeds speeds up the curing process. Total cure times of from about 4 to about 24 hours may be used.

In still another embodiment of the invention, boron may be incorporated into the polymeric precursor during the initial stages of the pyrolysis process, such as during the time that the fibers are being heated up to the temperature at which pyrolysis begins and the polymer composition converts to a ceramic composition. For example, incorporation of boron into the precursor polymer fibers can be effected by diffusion of a boron containing gas such as diborane into the infusibilized fibers.

Typically, pyrolysis becomes significant at about 400° C. so that as the polymer is subjected to temperatures above about 400° C., the incorporation of boron becomes increasingly difficult. Accordingly, if boron is incorporated after the infusibilizing step, it is preferred to treat the fibers with a boron containing gas at a temperature below about 400° C. for a time sufficient for the desired amount of boron containing gas to diffuse into the fibers. In this embodiment of the invention, the infusibilization stage of the process may be used for curing the polymeric precursor fibers without the need to incorporate boron into the fibers at that stage. However, it is within the scope of this invention to incorporate boron into the fibers at any or all of the stages of the process.

For those instances where a conventional cure is used to infusibilize the fibers, any of a number of processes may be utilized. For example, the fibers may be cured in air during heating. Alternatively, the fibers may be infusibilized by curing the fibers with gamma irradiation or ultraviolet light.

After infusibilization, the fibers are then pyrolyzed by heating them to a temperature in excess of about 1600° C., and preferably at a temperature of about 1800°-1850° C. It has been found that both oxygen and nitrogen are eliminated from the fibers at temperatures above about 1300° C. However, the best densification, modulus improvement, and stability when the fibers are subsequently exposed to high temperatures are achieved when the fibers are pyrolyzed at temperatures in excess of about 1600° C.

As mentioned above, boron may be incorporated into the fibers during the early stages of pyrolysis by exposing the fibers to an atmosphere containing a boron-containing gas. For example, the fibers may be exposed to an atmosphere containing diborane, or other boron hydrides such as tetraborane, pentaborane, or the like. Other boron-containing compounds such as borazine or trichloroborazine may also be used if the temperatures of the atmosphere are such that these compounds are vaporized and present in gaseous form.

Again, the concentration of the boron-containing compound in the atmosphere may be small. For example, if diborane is used, workable concentrations are in the range of from about 0.01 to about 1.0% by volume of the atmosphere. Again, inert gases such as argon, helium, or nitrogen may be used to make up the remainder of the atmosphere. Temperatures at which significant amounts of boron are deposited and diffuse into the fibers range from about 50° to about 500° C. The times for exposure to the boron-containing gaseous atmosphere may vary based on the diameter of the fibers, the concentration of the boron-containing gas in the atmosphere, and the temperatures used. Typical exposure times are in the range of from about 1 to about 24 hours.

At pyrolysis temperatures above about 1300° C., nitrogen-containing atmospheres are not preferred as nitrogen is not inert to the fibers under those temperature conditions. At high temperatures, truly inert gaseous atmospheres are preferred such as argon and/or helium. Pyrolysis temperatures in excess of about 2000° C. are not preferred as there is undesirable grain size growth of the silicon carbide ceramic which forms. This growth in grain size adversely affects fiber strength.

The time for which the fibers are held at a particular maximum temperature will vary inversely with the temperature. The duration of the pyrolysis treatment should be sufficient to reduce oxygen and/or nitrogen content of the fibers to below about 0.5% by weight, and preferably to about 0.2% by weight or less. Where the fibers are heated to about 1800° C., it has been found that that temperature should be maintained for about one hour. Lower pyrolysis temperatures require correspondingly longer treatment times.

The ceramic fibers which result from the process of the present invention have at least 75% crystallinity and have a density of at least about 2.9 gm/cm$^3$, which represents about 90-95% of theoretical density. The photomicrographs of FIGS. 1b and 2b illustrate the appearance of phenyl-modified methylpolydisilylazane fibers after boron incorporation and pyrolysis at 1800° C. for one hour in argon atmosphere. The FIG. 1b fiber contained 0.5% by weight boron in the polymer, while the FIG. 2b fiber contained 1.1% by weight boron in the polymer. The presence of boron distributed substantially uniformly throughout the fiber produces a dense fiber having a relatively smooth surface structure and fine grain sizes.

The silicon carbide fibers produced by the practice of the process of the present invention possess extremely fine grained structures having grain sizes of less than about 0.5 micrometers (less than about 500 nanometers), and typically in the range of about 200 nanometers. Virtually all of the oxygen and/or nitrogen originally present in, or introduced into, the fibers is removed by the high temperature pyrolysis step. Less than about 1.0%, and preferably less than about 0.5%, by weight oxygen and/or nitrogen remain.

Figure 1B:
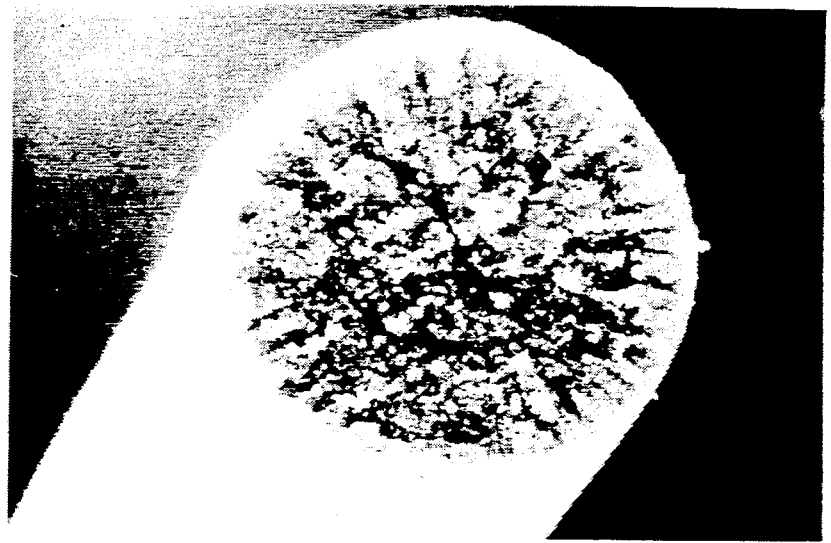
Figure 2A:
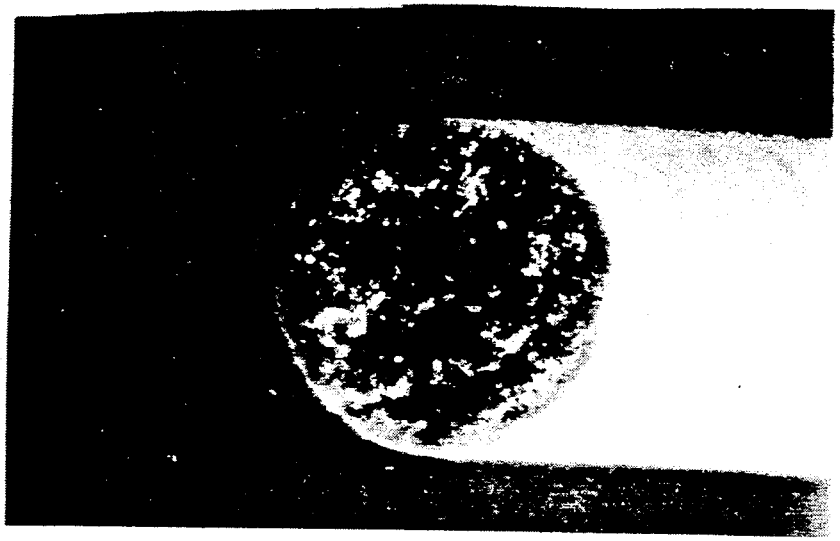
FIGS. 2a and 2b are photomicrographs (magnification 5,000× for FIG. 2a, 10,000× for FIG. 2b) taken with a scanning electron microscope of methylpolydisilylazane fibers after treatment at 1800° C. for 1 hour in argon atmosphere; the fiber of FIG. 2a had no boron, while the fiber of FIG. 2b, produced by the process of the present invention, contained about 1.1% boron.
Figure 2B:

By comparison, fibers treated in a similar manner, including high temperature pyrolysis but without boron incorporation, become porous, weakened mechanically, and coarse grained as illustrated by the photomicrographs of FIGS. 1a and 2a. It is believed that this porosity and weakening of mechanical strength occurs upon loss of gases containing CO, SiO, and $N_2$ during pyrolysis above about 1300° C. with concurrent crystallization.

In order that the invention may be more readily understood, reference is made to the following examples, which are intended to illustrate the invention, but are not to be taken as limiting the scope thereof.

EXAMPLE 1

A phenylvinyl-modified methylpolydisilylazane resin was synthesized using a procedure similar to the one taught by Gaul, Jr. in U.S. Pat. No. 4,340,619, by mixing together a mixture of 373 parts of methylchlorodisilanes, 64 parts of dichlorophenyl-vinylsilane, and 706 parts of hexamethyldisilazane in a reaction vessel. The reaction mixture was then slowly heated under an inert argon atmosphere to a temperature of 220° C. and held for thirty minutes. Volatile materials were distilled away by heating to 200° C. for 15 minutes. The resulting resin, containing phenyl and vinylsilyl substituents, was a solid at room temperature and had a $T_g$ of approximately 102° C. The resin was then spun into fibers by heating it to about 156°–172° C. in a monofilament spinning unit with an orifice diameter of 0.010 inch and extruded therefrom.

The fibers formed were cured in air for four hours at 65° C., then 35 hours at 150° C. to infusibilize them. The infusibilized fibers were then pyrolyzed in an argon atmosphere at 1200° C. Pyrolysis was carried out in a Lindberg tubular furnace with a heating rate of 3° C. per minute from ambient temperature to 1200° C. Amorphous, separable ceramic fibers were formed containing about 11.0% oxygen and 13.3% nitrogen. The fibers had a tensile strength of 167 Ksi (1 Ksi=1000 psi) and a density of 2.2 g/cm$^3$.

The infusibilized fibers were then further pyrolyzed in an argon atmosphere at 1600° C. for 1 hour. Oxygen content of the fibers was reduced to 0.4%, density increased to 2.6 g/cm$^3$, and X-ray diffraction showed the fibers to consist of about 35% alpha-SiC and 65% beta-SiC by weight. Weight loss was 38%, and the fibers were observed by a scanning electron microscope to be highly porous. The tensile strength of the fibers was too low to measure.

EXAMPLE 2

A phenylvinyl-modified methylpolydisilylazane resin having boron incorporated therein was synthesized using a procedure similar to that taught by Gaul, Jr. in U.S. Pat. No. 4,340,619, by mixing together a mixture of 373 parts of methylchlorodisilanes, 62.5 parts of dichlorophenylvinylsilane, 65.3 parts of boron tribromide, and 748 parts of hexamethyldisilazane in a reaction vessel. The reaction mixture was then slowly heated under an inert argon atmosphere to a temperature of 230° C. and held for thirty minutes. Volatile materials were distilled away as in Example 1. The resulting resin, which contained boron incorporated by adding BBr$_3$ during synthesis, was then spun into small diameter fibers and infusibilized by exposure to wet air. The fibers were then pyrolyzed in an argon atmosphere to 1200° C. at a rate of 3° C. per minute. The pyrolyzed fibers contained 1.2% boron and 30.1% oxygen by weight.

The fibers were then further pyrolyzed to 2100° C. in argon. After this pyrolysis, the fibers retained their shape although they appeared to be porous by scanning electron microscopy. Density was approximately 2.9 gm/cm$^3$ and oxygen content had been reduced to 0.13% by weight. Weight losses in the fibers after the second stage of pyrolysis was 83%. The addition of boron permitted shape retention by the fibers even with a very high initial oxygen content and a very high weight loss.

EXAMPLE 3

The methylpolydisilylazane resin fibers of Example 2 were infusibilized by exposure to wet air, then pyrolyzed in an argon atmosphere to 1200° C. at a rate of heating of 3° C. per minute. The pyrolyzed fibers contained 1.4% boron and 6.35% oxygen. They had a density of 2.2 g/cm$^3$, an average tensile strength of 95 Ksi (22 to 162 Ksi range), and an average modulus of 24.8 Msi (7.5 to 53.0 Msi range).

The fibers were then further pyrolyzed to 1800° C. in argon. A 28% weight loss occurred, and the density of the fibers increased to greater than 2.9 g/cm$^3$. Average tensile strength of the fibers remained substantially unchanged at 96 Ksi (52 to 132 Ksi range) and average modulus increased to 27.4 Msi (11.0 to 53.7 Msi range). The final density obtained was 90% of theoretical density for crystalline SiC. By comparison, the modulus for polycrystalline SiC is 60–65 Msi, a value approached by some of the fibers measured.

EXAMPLE 4

Fibers were prepared by pyrolysis to 1200° C. as in Example 3. The fibers had a density of 2.2 g/cm$^3$, an average tensile strength of 135 Ksi, an average elastic modulus of 27.6 Msi and an average diameter of 44.8 micrometers. They contained 17.0% nitrogen and 5.6% oxygen by weight.

The fibers were then further pyrolyzed to 1800° C. in argon by heating at 3.5° C. per minute and held at 1800° C. for 1 hour. Weight loss of the fibers was 28%. They had a density of greater than 2.9 g/cm$^3$ and were more than 90% by weight crystalline silicon carbide as determined by X-ray diffraction. The fibers had an average tensile strength of 125 Ksi, an average modulus of 47.1 Msi and an average diameter of 35.7 micrometers. They contained 1.1% oxygen and 0.5% nitrogen by weight.

While certain representative embodiments and details have been shown for purposes of illustrating the invention, it will be apparent to those skilled in the art that various changes in the methods disclosed herein may be made without departing from the scope of the invention, which is defined in the appended claims.

What is claimed is:

1. A process for the preparation of substantially polycrystalline silicon carbide fibers comprising the steps of:
   a) forming fibers from a preceramic polymeric precursor comprising methylpolydisilylazane resins;
   b) infusibilizing said fibers; and
   c) pyrolyzing said fibers at a temperature in excess of 1600° C. in a nonoxidizing atmosphere to form substantially polycrystalline silicon carbide fibers; said polymeric precursor or said fibers containing or having incorporated therein at least about 0.2% by weight boron either prior to step a), or during at least one of steps a), b), and c).

2. The process of claim 1 in which said substantially polycrystalline silicon carbide fibers have at least 75% crystallinity.

3. The process of claim 1 in which said substantially polycrystalline silicon carbide fibers have a density of at least about 2.9 gm/cc.

4. The process of claim 1 in which said fibers formed in step a) are formed by spinning.

5. The process of claim 4 in which said fibers formed in step a) are formed by melt spinning.

6. The process of claim 4 in which said fibers formed in step a) are formed by wet spinning.

7. The process of claim 4 in which said fibers formed in step a) are formed by dry spinning.

8. The process of claim 1 in which said fibers are infusibilized by curing said fibers in air.

9. The process of claim 1 in which said fibers are infusibilized by curing said fibers in an atmosphere containing a mixture of boron trichloride and ammonia or amine.

10. The process of claim 1 in which said fibers are infusibilized by curing said fibers in an atmosphere containing diborane.

11. The process of claim 1 in which said fibers are infusibilized by curing said fibers with gamma irradiation.

12. The process of claim 1 in which said fibers are infusibilized by curing said fibers with ultraviolet light.

13. The process of claim 1 in which said fibers are infusibilized by curing said fibers first in an atmosphere containing nitric oxide followed by curing said fibers in an atmosphere containing boron trichloride or diborane.

14. The process of claim 1 in which boron is incorporated into said polymeric precursor during said pyrolyzing step by exposing said polymeric precursor to a boron-containing gas.

15. The process of claim 1 in which said nonoxidizing atmosphere comprises a gas selected from the group consisting of argon, helium, and mixtures thereof.

16. The process of claim 1 in which said pyrolysis step includes heating said fibers to about 1800° C. and maintaining that temperature for about one hour.

17. The process of claim 1 in which boron is incorporated directly into said polymeric precursor by reacting said precursor with a boron-containing compound.

18. The process of claim 1 in which boron is incorporated into said polymeric precursor during said infusibilization step by exposing said polymeric precursor to a boron-containing gas.

19. Substantially polycrystalline silicon carbide fibers containing at least about 0.2% by weight boron, a density of at least about 2.9 gm/cm$^3$, and an average grain size of less than about 0.5 micrometers.

20. The fibers of claim 19 in which said fibers have a diameter of less than about 50 micrometers.

* * * * *